United States Patent [19]
Culley, Jr. et al.

[11] Patent Number: 5,222,709
[45] Date of Patent: Jun. 29, 1993

[54] VEHICLE SEAT SUSPENSION UNIT

[75] Inventors: Donald M. Culley, Jr., Buderim; William J. S. Bailey, West Pennant Hills; Stephen J. Ward, Annandale, all of Australia

[73] Assignee: Rosdon Engineering and Manufacturing Pty. Ltd., Buderim, Australia

[21] Appl. No.: 879,919

[22] Filed: May 8, 1992

Related U.S. Application Data
[63] Continuation-in-part of Ser. No. 805,562.

[30] Foreign Application Priority Data

Apr. 13, 1990 [AU] Australia ............... PF3673

[51] Int. Cl.⁵ ............................................. F16M 13/00
[52] U.S. Cl. .................................. 248/421; 248/588; 267/74; 267/131; 296/65.1
[58] Field of Search .............. 248/421, 588, 157, 161, 248/575; 296/65.1; 267/131, 133, 74, 177

[56] References Cited

U.S. PATENT DOCUMENTS

| | | | |
|---|---|---|---|
| 4,125,242 | 11/1978 | Meiller et al. | 248/399 |
| 4,151,973 | 5/1979 | Sedlock | 248/421 X |
| 4,382,573 | 5/1983 | Aondetto | 248/421 X |
| 4,448,386 | 5/1984 | Moorhouse et al. | 248/564 |
| 4,566,667 | 1/1986 | Yanagisawa | 248/421 X |
| 4,880,201 | 11/1989 | Hall et al. | 248/588 X |

FOREIGN PATENT DOCUMENTS

| | | |
|---|---|---|
| 582031 | 6/1987 | Australia . |
| 2359326 | 6/1975 | Fed. Rep. of Germany . |
| 1521316 | 8/1978 | United Kingdom . |

*Primary Examiner*—Ramon O. Ramirez
*Attorney, Agent, or Firm*—Larson and Taylor

[57] ABSTRACT

A vehicle seat suspension unit has a base frame mountable in a vehicle and seat support frame on which is mounted a vehicle seat. A scissor-arm assembly, with primary links and secondary links, interconnect the frames overlapping cam tracks, with cam profiles engaged by rollers attached to main springs anchored on the base frame. As the frames move towards each other, the main springs are extended as the rollers move along the cam tracks to apply a restoring force to the frames. A preload assembly has rocker arms, pivotally mounted on the cam tracks, with rollers bearing on the seat support frame and provided with preload springs. By adjustment of the cam tracks relative to the base frame, the preload and the main spring rate can be varied to suit the operator's weight.

13 Claims, 5 Drawing Sheets

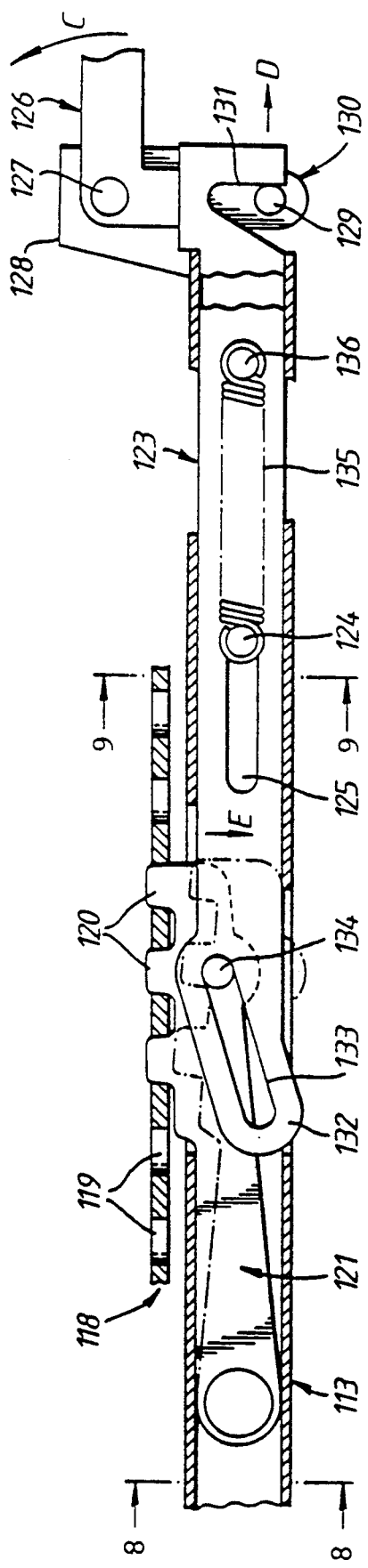

VEHICLE SEAT SUSPENSION UNIT

This application is a continuation-in-part of Ser. No. 07/805,562, filed Dec. 13, 1992 and processed and retained pursuant to 37 CFR 1.53(d), which is a continuation of international application No. PCT/AU90/00144 filed Apr. 4, 1990 and now abandoned.

BACKGROUND OF THE INVENTION

1. Field of the Invention

THIS INVENTION relates to a vehicle seat suspension unit. The term "vehicle" shall be used to include automobiles, four-wheel-drives (4WD), trucks, prime movers, earthmoving machines (e.g. bulldozers), aircraft and watercraft.

2. Prior Art

A vehicle operator's comfort and efficiency is dependent on providing a suitable suspension unit for his seat to eliminate, or at least reduce, the shocks and vibration transmitted from the vehicle to the operator via his seat.

Many suspension units have been proposed to reduce the shocks and vibration. Generally, most rely on a spring-loaded seat support frame which is damped by a hydraulic or pneumatic damper unit An example is disclosed in AU-B-66509/86 (582031) (D. M. Culley et al). The major problem with these units is that the damping can effectively be so slow that the suspension unit goes out of phase with the vehicle suspension and the damping can apply an additive shock to the operator's seat. In many cases, operators remove the damping effect as it is preferable to have a "floating" undamped suspension unit than a poorly damped one.

One of the reasons for the failure of the existing suspension units has been a basic misunderstanding of seat suspension unit design. The design objective is to provide a unit where the operator's seat follows an almost undisturbed path as the vehicle passes over bumps or depressions. In the past, the designers have worked on the principle of the seat moving relative to the vehicle, whereas they could have been designing for movement of the vehicle relative to the seat. In addition, they have applied damping to the suspension unit which is not required.

SUMMARY OF THE PRESENT INVENTION

It is an object of the present invention to provide a seat suspension unit which provides improved insulation from shock and vibration compared to existing units.

It is a preferred object to provide a unit where damping per se is not required.

It is a further preferred object to provide a unit which has a rising suspension rate from its normal preload position.

It is a still further preferred object to provide an adjustable preload to the unit to suit the weight of the operator.

It is a still further preferred object to provide a unit which has a very low profile and which incorporates the seat runners within its base frame.

Other preferred objects of the present invention will become apparent from the following description.

In one aspect the present invention resides in a vehicle seat suspension unit including:

a base frame mountable on a vehicle;

a seat support frame to mount a vehicle operator's seat;

a scissor arms assembly interconnecting the frames to enable the frames to move relative to each other substantially in parallelism;

a pair of cam track means on the scissor arms assembly engageable by respective cam follower means mounted on a follower support means; and spring means interconnecting the follower support means and the scissor arms assembly or one of the frames;

so arranged that as the frames move relatively towards each other, the cam follower means travel along the cam track means to extend the spring means, the extension of the spring means opposing the movement of the frames from their relative initial position.

In a second aspect, the present invention resides in a vehicle seat suspension unit including:

a base frame mountable on a vehicle;

a seat support frame to mount a vehicle operator's seat;

a scissor arms assembly interconnecting the frames to enable the frames to move relative to each other substantially in parallelism;

a pair of cam track means having a first cam track on the scissor arms assembly and a second cam track on one of the frames, the cam track means being engageable by respective cam follower means mounted on a follower support means; and spring means interconnecting the follower support means and the scissor arms assembly or one of the frames;

so arranged that as the frames move relatively towards each other, the cam follower means travel along the cam track means to extend the spring means, the extension of the spring means opposing the movement of the frames from their relative initial position.

Preferably, the frames are substantially rectangular in plan view. Preferably, the base frame incorporates the runners or slides for longitudinal adjustment of the seat in the vehicle.

The seat support frame may have the seat bolted to it or the frame may be moulded into the base of the seat.

Preferably, the scissor arms assembly includes a pair of primary scissor arms and a pair of secondary scissor arms pivotally connected to the frames and to each other. The second scissor arm may be connected to the frames by pivotal links. Reinforcing plates may connect the arms in each pair.

Preferably, the cam tracks overlap, the cam tracks moving towards each other as the frames move together. Preferably, the cam tracks are offset so that each is engaged by a respective roller (as the cam follower means). Preferably the shape of the cam tracks prevents the "bottoming out" of the frame.

Preferably, the rollers are rotatably mounted on the ends of a transverse yoke (as the follower support means) and a pair of tension springs connect the yoke to the base frame.

An adjustable preload unit may be provided, with a rocker arm pivotally mounted at one end of one of the cam tracks and with a roller engageable with one of the frames, a preload spring being connected to the rocker arm, intermediate its length, and to the other of the frames.

One of the cam tracks of each pair may be adjustable to vary the preload on the preload unit and the tension on the spring means.

Preferably, the seat adjustment sides are vertical and are separated by an anti-function element which also acts as a spring element to provide rattle free assembly and use over a wide range of component tolerances.

Preferably, the seat adjustment slides incorporate a latching mechanism, preferably located within the rack forming the slides, able to provide restraint against loads applied by the fitting of a seat belt to the seat or seat support frame.

A bellows (or diaphragm) means may be provided between the two frames to control the movement between the frames. Preferably, the bellows only provides effective control at the end of its opening stroke to prevent "topping-out" of the frames.

BRIEF DESCRIPTION OF THE DRAWINGS

To enable the invention to be fully understood, a number of preferred embodiments will now be described with reference to the accompanying drawings, in which:

FIG. 7 is a section side view of one of the seat slide assemblies;

FIG. 8 is a sectional end view taken on line 8—8 on FIG. 7; and

FIG. 9 is a sectional end view taken on line 9—9 on FIG. 7.

DETAILED DESCRIPTION OF THE PREFERRED EMBODIMENTS

Figure 1:
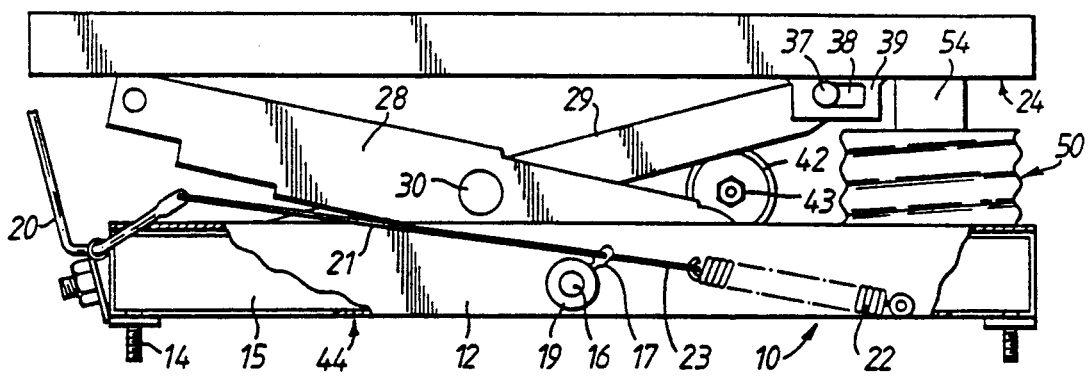
FIG. 1 is a side view of a first embodiment of the unit, parts being shown in section for clarity.
Figure 2:
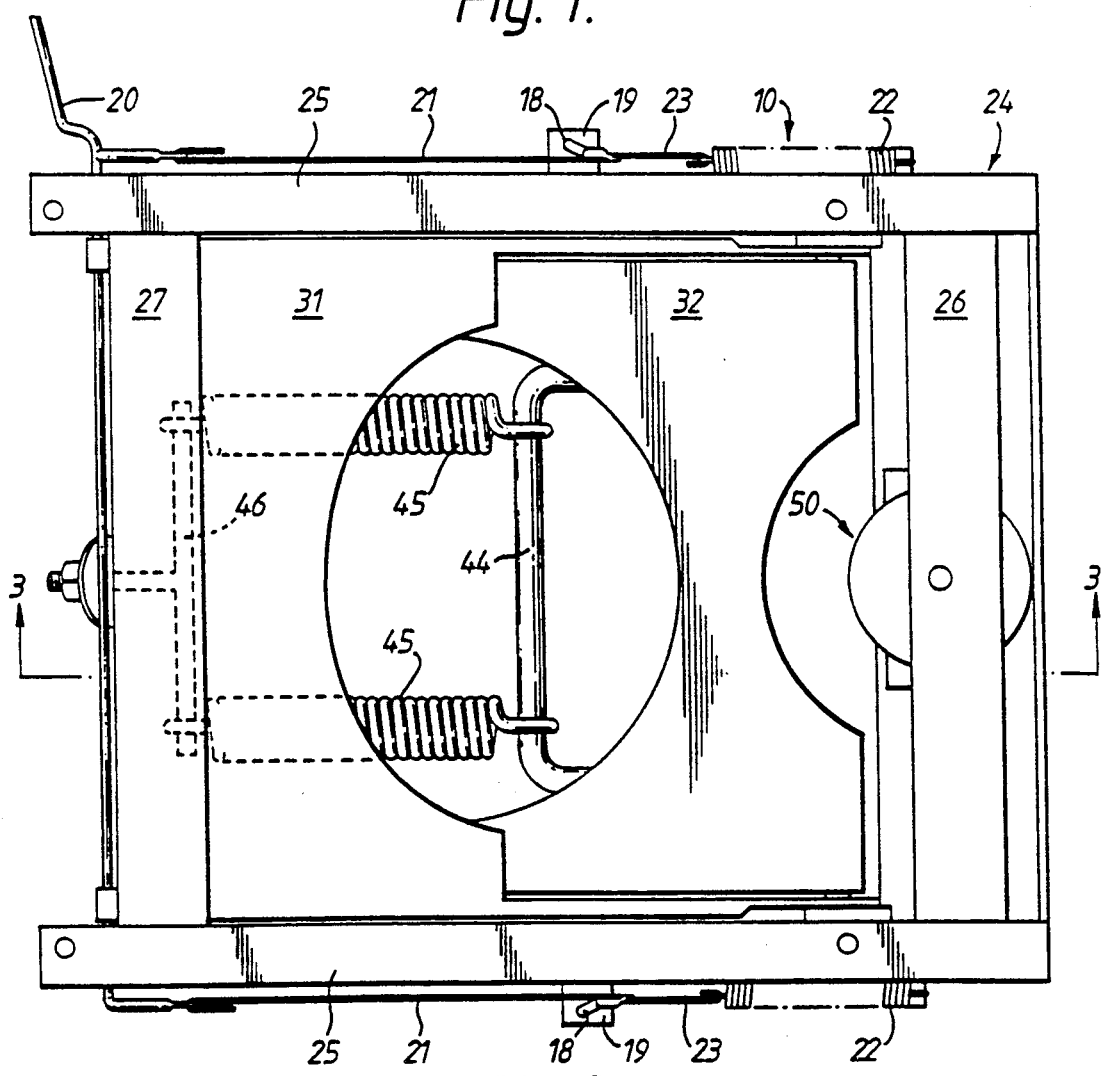
FIG. 2 is a top plan view of the unit.
Figure 3:
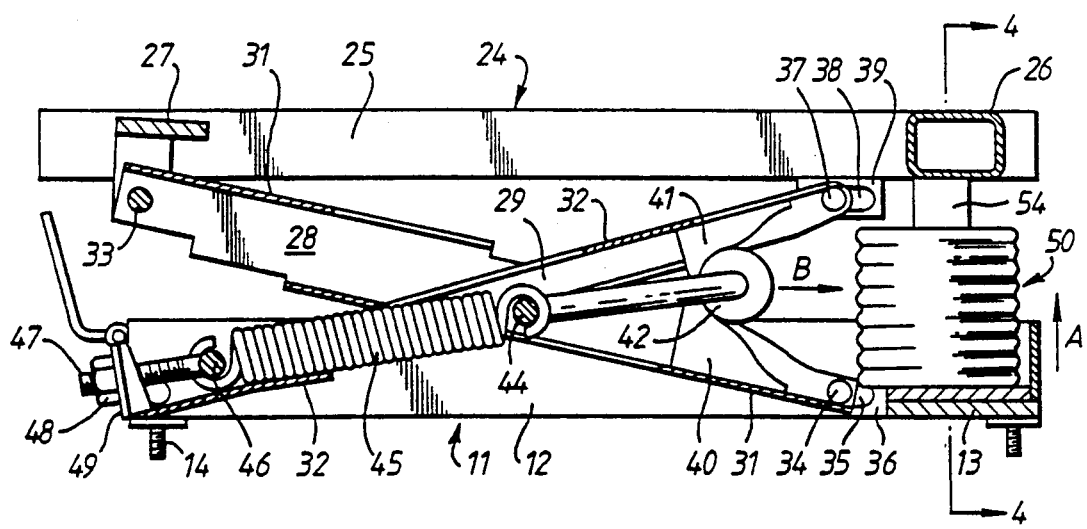
FIG. 3 is a sectioned side view taken on line 3—3 on FIG. 2.
Figure 4:
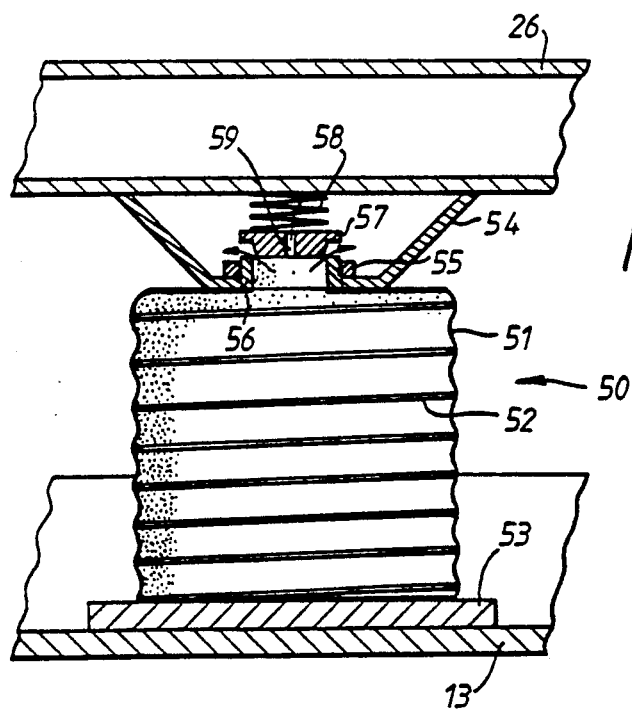
FIG. 4 is a sectioned end view of the bellows taken on line 4—4 on FIG. 3.

Referring to FIGS. 1 to 3, the first embodiment of the seat suspension unit 10 has a substantially U-shaped base frame 11, the side rails 12 which are of RHS steel, and the rear rail 13 of which is of angle-sectioned steel. The ends of the bottom walls of the side rails 12 are slotted to receive the studs 14 of the seat runners 15 slidably received in the side rails 12. Each runner 15 is releasably locked by a transverse pin which has a finger 17 received in a cam slot 18 in a boss 19. An operating handle 20 extends across the front of the base frame 11 and is connected to the fingers 17 by rods 21. By rotation of the handle, the pins 16 are rotated and moved to a retracted position by the fingers 17 moving in their cam slots 18. The pins are urged into their locked positions by springs 22 via rods 23.

A substantially rectangular seat support frame 24 has side rails 25 and a rear rail 26 of RHS steel and a front rail 27 of flat steel.

The base frame 11 and seat support frame 24 are connected one above the other in parallel by a pair of primary scissor arms 28 and a pair of secondary scissor arms 29, the middle part of each secondary scissor arm 29 being pivoted to the middle part of a primary scissor arm 28 by a pivot pin 30. Transverse plates 31, 32 reinforce (and interconnect) the respective scissor arm pairs 28, 29.

The top or front ends of the two primary scissor arms 28 are pivoted about a transverse axis (defined by a transverse shaft 33) within the front end of the seat support frame 24. The bottom or front ends of the secondary scissor arms 29 are pivoted about a transverse axis (defined by a transverse shaft) within the front end of the base frame 11. The bottom or rear ends of the two primary scissor arms 28 have pivot pins 34 slidably received in slots 35 in blocks 36 at the inner sides of the rear ends of the side rails 12 of the base frame 11, and the upper and rear ends of the two secondary scissor arms 29 have similar pivot pins 37 slidably received in slots 38 in blocks 39 on the inner side of the rear ends of the side rails 26 of the seat support frame 24.

Respective cam tracks 40, 41 are provided on the rear ends of the primary and secondary scissor arms 28, 29. The forward ends of the cam tracks overlap and the cam tracks are transversely offset in front view.

A pair of rollers 42 (spaced by a washer) are rotatably mounted on axles 43 at each end of a substantially U-shaped transverse yoke 44.

A pair of tension springs 45 are anchored at one end to the yoke 44 and at the other end to a balance bar 46 which has a central screw-threaded rod 47 which receives a nut 48. The nut 48 bears on a bracket 49 on the reinforcing plate 32 interconnecting the forward ends of the secondary scissor arms 29.

A bellows assembly 50 has a flexible rubber bladder 51 supported by an internal coil spring 52, the base of the bladder 51 being secured to a rear rail 13 of the base frame 11. A bracket 54 connects the top of the bladder 51 to the rear rail 26 of the seat support frame 24, the bracket being secured by a nut 55 on a threaded tube 56 open to the interior of the bladder.

A rubber valve member 57 is normally urged into engagement with the end of the tube 56 by a lightweight compression spring 58 and is unseated to allow the rapid egress of air when the bellow assembly 50 is collapsed by the frames 11, 24 moving towards each other. A relatively large diameter hole 59 in the valve member 57 allows relatively unrestricted egress of the air into the bellows assembly 50 when the frames 11, 24 are moved apart.

The operation of the suspension unit 10 will now be described. NB. It will be assumed that the seat support frame remains relatively stationary and that the base frame moves vertically relative to it, i.e., the path of the operator's seat is relatively undisturbed as the vehicle moves over bumps and holes (or waves and troughs for watercraft).

The seat runners 15 are bolted to the floor of the vehicle cabin (not shown) via the studs 14 and the position of the suspension unit 10 (and the seat) can be adjusted by operating handle 20 to release the pins 16 to allow the seat frame 11 to move along the runners 15.

The operator sits in the seat (not shown) bolted to the seat support frame 24 and the distance between the frames is reduced to the initial preload height determined by the tension set on the springs 45 via adjustment of the nut 48. (This allows operators of different weights to be easily accommodated). When the vehicle strikes a bump and tends to rise, the base frame 11 moves upwardly (in the direction of arrow A) towards the seat support frame (as a datum). The cam tracks 40, 41 converge due to the closing of the scissor arms 28, 29 about their pivot pins 30 and the rollers are urged rearwardly in the direction of the arrow B. The yoke 44 pulls on the springs 45 and the base frame 11 rises until the tension in the springs 45 on the yoke 44 equals the force on the rollers 42 from the cam tracks 40, 41 tending to move the rollers in the direction of arrow B.

When the vehicle passes over the bump, the rollers 42 are pulled against the cam tracks 40, 41 in the direction opposite to arrow B to restore the distance between the frames 11, 24.

As the displacement of the base frame 11 in the direction of arrow A increases the angular displacement of the scissor arms 28, 29 at an increasing rate, the suspension unit has a rising rate of force opposing further vertical displacement of the base frame 11 from its initial position. This means that the effective springing rate of the unit increases with displacement of the base frame from its initial preload position The shape of the cam tracks prevents the seat frame from bottoming out.

When the vehicle falls into a hole, the base frame 11 will move in the direction opposite to arrow A and the rollers will move in the direction opposite to arrow B. By selecting the contours of the cam tracks 40, 41, a reduced restoring force is applied on the rollers 42 by the springs and the base frame 11 can then move in the direction of arrow A toward its initial preload position.

The bellows assembly 50 does not provide damping but only travel control when the vehicle encounters a hole. Assuming the vehicle has encountered a bump and the base frame 11 is moved in the direction of arrow A, the bladder 51 begins to collapse, supported by the internal spring 52 and air is exhausted from the bladder by the unseating of the valve member 57. The pressure inside the bladder exceeds atmospheric pressure towards the end of the stroke When the base frame begins to fall (i.e. move in the direction opposite to arrow A), the valve member 57 is reseated but the air rapidly enters the bladder via the hole 59. Initially, the air pressure in the bladder falls to atmospheric and it is only towards the end of the stroke that the pressure becomes negative (i.e. a vacuum) to provide a "damping" effect and indeed, is more accurately termed a travel control. This prevents the frames going past the pre-load position and "topping-out".

By changing the profile of the cam tracks 40, 41 and the tension on the springs 45, the seat suspension unit 10 can be tailor made for a particular operator, e.g. an owner/driver of an interstate semi-trailer. However, general cam track profiles can be provided which, with adjustment of the tension of the springs, can enable a wide range of operators to use the unit and receive a very high standard of ride. Because the bellows does not provide damping, but only travel control, the unit does not allow the operators' seat to go out-of-phase with the vehicle suspension and so a high quality ride is ensured.

Figure 5:
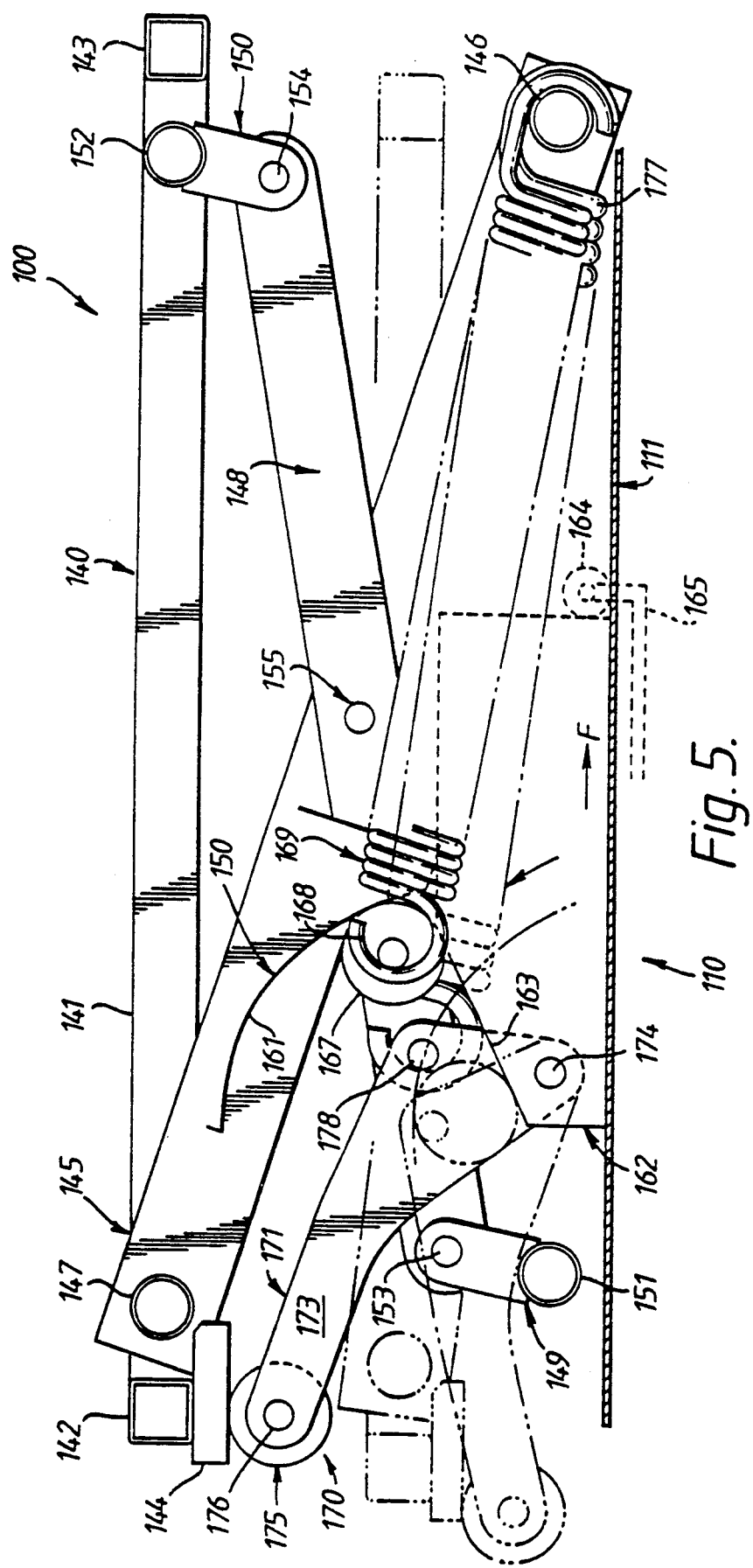
FIG. 5 is a side view of a second embodiment of the unit, parts being omitted for clarity.
Figure 6:
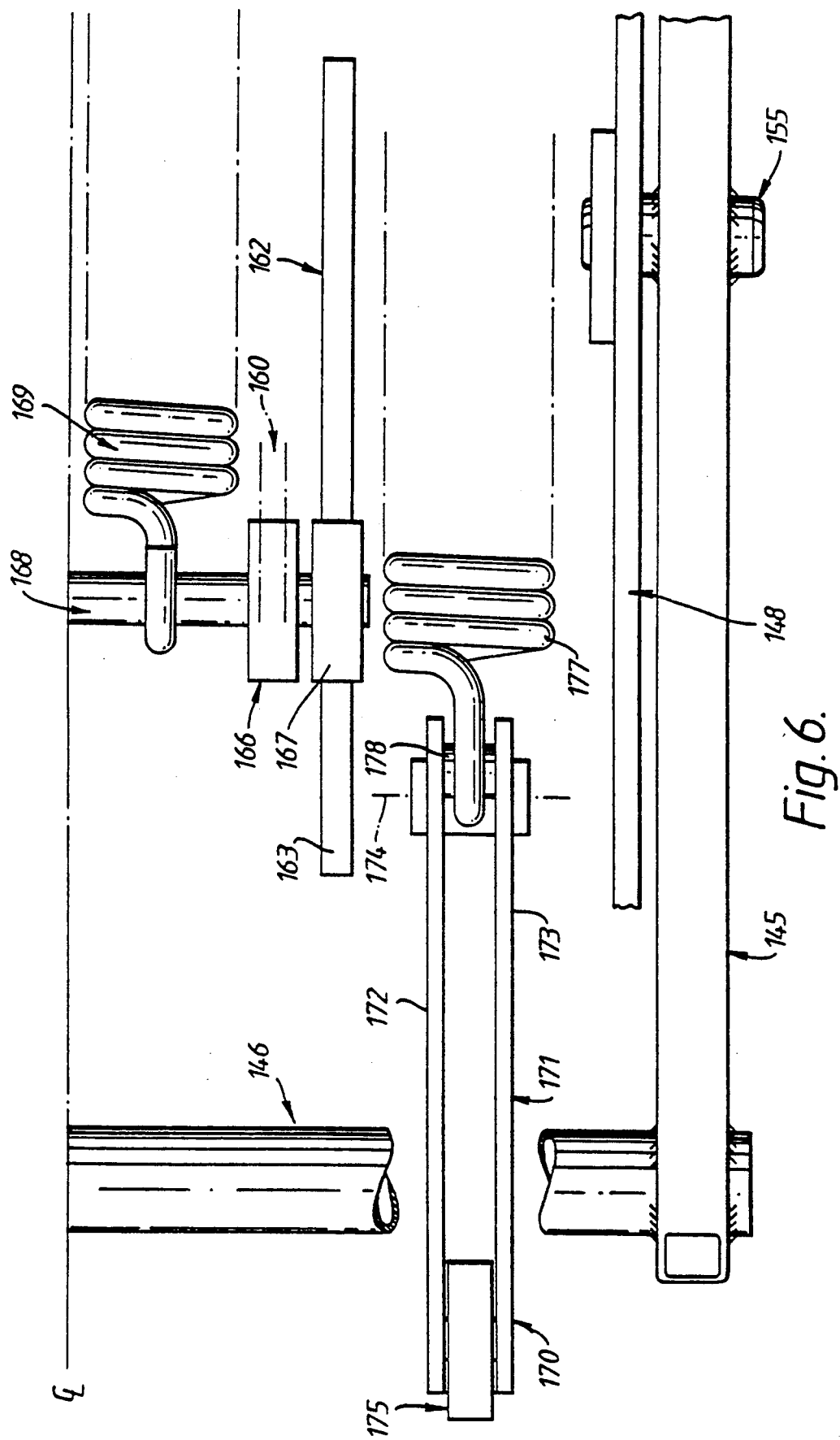
FIG. 6 is a plan view of one half of the second embodiment, parts being omitted for clarity.

Referring now to FIGS. 5 and 6, the second embodiment of the seat suspension unit 100 has a base frame 110 formed from sheet metal and incorporating a floor plate 111 with side flanges 112 (see FIGS. 8 and 9).

Referring to FIGS. 7 to 9, a top-hat section frame slide rail 113 is fixed to each side flange 112 and is slidably received in a base slide rail 114 anchored to the vehicle floor by studs (not shown) where their heads are received in the T-shaped slot 115 in the bottom of the base slide rail 114. The side flanges of the frame slide rail 113 are received in the channel-section anti-friction strips 116, 117, with integral side lips which act as spring elements to provide a rattle-free seat slide assembly.

A horizontal flange 118 on the base slide rail 114 is provided with a series of equally spaced slots or holes 119 which are releasably engageable by teeth 120 on a pivotally mounted locking bar 121, the locking bar 121 being hingedly mounted within the frame slide rail 113 as a pivot pin 122.

The operation of the locking bar 121 is controlled by a release bar 123 slidably mounted within the frame slide rail 113, with a pin 124 on the frame silde rail 113 being received with an elongate slot 125 in the release bar 123.

A bell-crank 126 is pivotally mounted, via first shaft 127, on a vertical plate 128 at the forward end of the frame slide rail 113, and has a handle (not shown). A pin 129 on the leg 130 of the bell-crank 126 is received in a slot 131 at the end of the release bar 123. The other end of the release bar 123 is provided with an inclined, elongated loop member 132 with an inclined cam slot 133 in which is received a follower pin 134.

A tension spring 135 is anchored at one end of the pin 124 on the frame slide rail 113 and at the other end on a pin 136 on the release bar 123.

The pivot shaft 127 interconnects the handle (not shown) to the bell-crank on the other seat slide assembly so that the two seat slide assemblies will operate in unison.

As the handle is raised, the bell-crank 126 pivots in the direction of arrow C and the pin 129 in slot 131 moves the release bar 123 forwardly in the direction of arrow D against the tension spring 135. As the loop member 132 advances, the follower pin 134 in the cam slot 133 moves the locking bar 121 downwardly in the direction of arrow E, to the position shown in dashed lines, where the teeth 120 are disengaged from the slots 119 in the flanges 118 on the base slide rail 114. The unit 100 can then be moved relative to the base slide rail 114 to allow adjustment of the seat position. On release of the handle, the release bar 123 returns to its original position and the teeth 120 on the locking bar 121 re-engage the slots 119 in the flange 118 to securely anchor the seat longitudinally.

Referring now to FIGS. 5 and 6, the substantially rectangular seat support frame 140 has side rails 141, rear rail 142 and front rail 143 all of RHS steel. A horizontal plate 144 is welded to the underside of the rear rail 142.

The base frame 110 and the seat frame 140 are connected one above the other substantially in parallel by a pair of primary links 145, pivotally connected to the base frame 110 and the seat frame 140 via transverse tubes 146, 147, and by a pair of secondary links 148 which are connected to the base frame 110 and seat frame 140 by intermediate links (or pivot members) 149, 150. The intermediate links 149, 150 are pivotally mounted on the base frame and seat frame via pivot pins 151, 152 and are connected to the secondary links 148 via pivot pins 153, 154. The primary and secondary links are pivotally interconnected in a scissor-like arrangement, via a pivot pin 155. The primary links 145 are torsionally stiff and carry higher loads in bending and in torsion than the secondary links 148 which are stiffest in bending. By suitable choice of parameters, the motion of the seat with respect to the seat slide assemblies is essentially parallel with a small element of translation.

A respective first cam track 160, with a curved profile 161 is provided parallel to, but spaced from, each primary link, the cam tracks interconnecting the transverse tubes 146, 147. A respective second cam track 162, With an inclined ramp profile 163, is slidable mounted on the floor plate 111 of the base frame 110 and is selectively adjustable via a cam 164 controlled by a lever 165. The adjacent pairs of first and second cam tracks 160, 162 are arranged so that their profiles 161, 163 overlap.

A respective pair of rollers 166, 167 engage the respective cam tracks 160, 162, the rollers being provided at respective ends of a transverse bar 168, to which is anchored one end of a pair of main springs 169 anchored at the other end to the transverse tube 146.

An adjustable preload assembly 170 has a pair of rocker arms 171, formed of parallel side plates 172, 173, each pivotally anchored via a pivot pin 174 on a respective one of the secondary cam tracks 162. A roller 175 is rotatably mounted on an axle 176 at the other end of each rocker arm 171, and bears on the underside of the horizontal plate 144. A preload spring 177 is provided for each rocker arm 171, being connected to a transverse pin 178, interconnecting the side plates 172, 173, and anchored to the transverse tube 146.

The preload assembly 170, via the rocker arms 171 and the preload springs 177, together with the primary and secondary cam tracks 160, 162, and main springs 169, provide an essentially contstant preload in the vertical direction which is adjustable for different preloads by the operator.

In FIG. 5, the secondary cam track 162 is shown in the position for maximum preload If the cam 164 is rotated to allow the secondary cam track to move in the direction of arrow F, the rocker arms 171 mounted thereon will also move in direction of F and the tension on both the main springs 169 and the preload springs 177 will be reduced, reducing the preload on the unit.

Once the operator has set the preload, it will remain constant over a wide range of vertical positions in use and the spring stiffness is essentially zero. This provides isolation from the vehicle approaching 100% over the travel range (e.g. of 70 mm) between the initial preload position shown in solid lines in FIG. 5 and the full travel position shown in dashed lines.

However, as the effective mass is constantly changing (due to change of posture, forces or controls and most importantly, the acceleration experienced by the seat slides, assemblies, which are attached to the vehicle), the main springs 169 and the cam tracks 160, 162 are incorporated to provide support of the effective mass less the preload, i.e. Net Suspended Mass=Effective Mass−Preload.

This allows a fundamentally softer springing element, which for the low frequencies of vibration (the most sensitive to the operator) allows a significant reduction in force/acceleration/displacement transmission to be achieved by mechnical means.

As stated above, the adjustment of the secondary cam tracks 162 allows adjustment of both the preload and the main spring rate to suit the operator's weight.

It will be readily apparent to the skilled addressee that the present invention provides a simple, yet highly efficient seat suspension unit and its comfort nature allows it to have a very low profile with the desired range of travel.

Various changes and modifications may be made to the embodiments described and illustrated without departing from the scope of the present invention as defined in the appended claims.

We claim:

1. A vehicle seat suspension unit including:
a base frame mountable on a vehicle;
a seat support frame to mount a vehicle operator's seat;
a scissor arms assembly interconnecting the frames to enable the frames to move relative to each other substantially in parallelism;
a pair of cam track means for controlling relative movement of the frames, each pair including a first cam track on the scissor arms assembly and an associated second cam track on one of the frames;
a respective cam follower means for engaging the first and second cam tracks of each respective pair;
a follower support means for mounting the cam follower means for engagement with the first and second cam tracks of each pair; and
a spring means interconnecting the follower support means and the scissor arms assembly or one of the frames for urging the follower support means in a direction for engagement of the respective cam follower means with the respective first and second cam tracks of each pair;
such that as the frames move relatively towards each other from an initial position, the cam follower means travel along the cam track means to extend the spring means with the extension of the spring means opposing the movement of the frames from the initial position to provide insulation from shock and vibration between the frames.

2. A unit according to claim 1 wherein:
the scissor arms assembly includes a pair of primary links pivotally connected to the frames, and a pair of second links connected to the frames by intermediate links pivotally connected to the frames, the primary and secondary links being pivotally connected intermediate their lengths.

3. A unit according to claim 2 wherein:
the first cam tracks are mounted parallel to, and are movable with, the primary links;
the second cam tracks are adjustably mounted on the base frame; and
each respective pair of first and second cam tracks overlap at their forward ends and are axially offset to be engaged by respective cam follower means.

4. A unit according to claim 1 wherein:
the cam follower means are rollers rotatably mounted in spaced pairs at the ends of a transverse bar provided as the cam follower support means.

5. A unit according to claim 4 wherein:
the spring means includes a pair of main tension springs interconnecting the transverse bar to the base frame; and
means are provided to enable tension of the main springs to be varied.

6. A unit according to claim 5, wherein:
the first cam tracks are mounted parallel to, and are movable with, the primary links;
the second cam tracks are adjustably mounted on the base frame;
each respective pair of first and second cam tracks overlap at their forward ends and are axially offset to be engaged by respective cam follower means; and
a tension on the main springs is adjusted by movement of the second cam tracks relative to the base frame.

7. A unit according to claim 1 wherein:
the cam tracks are profiled to provide a rising rate of spring stiffness as the distance between the two frames is reduced due to displacement of the base frame relative to the seat support frame from an initial preload position.

8. A unit according to claim 1 and further including:
a preload assembly to provide a substantially constant preload in a vertical direction to the unit over a full range of travel, where the preload assembly has a spring stiffness of approximately zero.

9. A unit according to claim 8 wherein:
the preload assembly includes a pair of rocker arms mounted at one end of the cam track means;
roller means at the other end of the rocker arms engageable with one of the frames; and
preload springs interconnecting the rocker arms, intermediate their length, to the other of the frames.

10. A unit according to claim 9 wherein:
the rocker arms are mounted on the second cam tracks, the roller means bear on the underside of the seat support frame and the preload springs are anchored to the base frame, adjustment of the second cam tracks on the base frame adjusting the preload on the unit.

11. A unit according to claim 1 wherein:
the base frame is provided with a pair of substantially vertical frame slide rails slidably received in base slide rails anchored to the vehicle floor; and
lock means releasably lock the respective slide rails to enable adjustment of the seat relative to the vehicle.

12. A unit according to claim 11 wherein:
the frame slide rails are received in anti-friction elements in the base slide rails, the elements having integral spring members to prevent the rails from rattling; and
the locking means includes locking bars, received within the frame slide means and pivotally mounted thereon, with teeth releasably engageable with holes in flanges on the base slide rails.

13. A unit according to claim 12 wherein:
a respective release bar is slidably mounted on each frame slide rail and is movable by a lever via a bell-crank mechanism, the release bar having an inclined cam slot engageable by a pin on its associated locking bar and so arranged that as the release bar is advanced from an initial position, the cam slot causes the pin to move the teeth out of locking engagement with the holes in the flange on the base slide rail;
spring means are provided to urge the release bar to its initial position.

* * * * *